United States Patent

Tanaka et al.

[11] Patent Number: 5,993,530
[45] Date of Patent: Nov. 30, 1999

[54] AQUEOUS DISPERSION OF BIODEGRADABLE RESIN COMPOSITION

[75] Inventors: Hideyuki Tanaka; Nobuhiro Hosokawa; Nobuyuki Sugtura; Masato Takahara, all of Hekinan, Japan

[73] Assignee: Japan Corn Starch Co., Ltd., Nagoya, Japan

[21] Appl. No.: 09/029,263

[22] PCT Filed: Sep. 10, 1996

[86] PCT No.: PCT/JP96/02576

§ 371 Date: Mar. 9, 1998

§ 102(e) Date: Mar. 9, 1998

[87] PCT Pub. No.: WO97/10292

PCT Pub. Date: Mar. 20, 1997

[30] Foreign Application Priority Data

Sep. 13, 1995 [JP] Japan .................................. 7-235675

[51] Int. Cl.⁶ ..................... C09D 103/06; D21H 17/00; D21H 19/00; B32B 15/04; B32B 21/00; B32B 27/00; B32B 29/00; B32B 25/08

[52] U.S. Cl. ..................... 106/206.1; 524/45; 524/46; 524/47; 524/50; 524/51; 524/52; 524/53; 524/54; 162/164.1; 162/164.4; 162/164.5; 162/164.6; 162/175; 162/177; 162/178; 427/385.5; 427/388.4; 427/389.9; 427/393.5; 427/393.6; 428/458; 428/464; 428/467; 428/457; 428/480; 428/497; 428/532; 428/533; 428/537.1; 428/537.5

[58] Field of Search ............... 106/206.1, 207.1, 106/207.2, 207.3, 207.4, 207.5, 209.1, 210.1, 213.1, 214.1, 215.2, 215.3, 215.4, 217.01, 162.7, 162.81, 162.9, 205.1, 205.2, 205.6, 205.71; 524/27, 28, 35–46, 47, 50–54; 162/164.1, 164.4, 164.5, 164.6, 175, 177, 178; 427/385.5, 388.4, 389.9, 393.5, 393.6; 428/458, 464, 467, 457, 480, 497, 532, 533, 537.1, 537.5

[56] References Cited

U.S. PATENT DOCUMENTS

| | | | |
|---|---|---|---|
| 4,301,017 | 11/1981 | Kightlinger et al. | 252/8.6 |
| 5,003,022 | 3/1991 | Nguyen et al. | 527/300 |
| 5,540,929 | 7/1996 | Narayan et al. | 424/422 |
| 5,719,214 | 2/1998 | Tanaka et al. | 524/47 |

FOREIGN PATENT DOCUMENTS 5-331315  12/1993  Japan .
6-316655  11/1994  Japan .

Primary Examiner—David Brunsman
Attorney, Agent, or Firm—Nikaido Marmelstein Murray & Oram, LLP.

[57] ABSTRACT

A thermally-decomposable, biodegradable resin composition is dispersed and stabilized in water optionally along with additives to give an aqueous dispersion of the resin composition. In the dispersion, the base polymer consists substantially of a water-insoluble starch-type, biodegradable resin. The dispersion is usable in various fields of papermaking, non-woven fabric production, film and sheet production and woven fabric production, in those of dispersed adhesive production, and in those of metal processing, plastic processing, wood processing and stone processing.

47 Claims, No Drawings

AQUEOUS DISPERSION OF BIODEGRADABLE RESIN COMPOSITION

BACKGROUND ART

The present invention relates to an aqueous dispersion of a degradable resin composition, which is prepared by dispersing and stabilizing in water an essential composition comprising a base polymer that consists substantially of a water-insoluble starch-type, biodegradable resin, and optionally a plasticizer, a filler, an antioxidant, a stabilizer, a dispersant, an emulsifier, a thickener and a solvent.

It relates to an aqueous dispersion of a biodegradable resin composition with good handlability, which is thermoplastic and biodegradable and which is used in various fields of papermaking, non-woven fabric production, film and sheet production and woven fabric production, in those of dispersed adhesive production, and in those of metal processing, plastic processing, wood processing and stone processing.

With various environmental problems being much discussed, materials good to the environment, such as typically various biodegradable plastics and processed paper, and applicable to the field where synthetic polymers have heretofore been used are being studied and developed. In particular, the applications of those materials to laminates and films are being much studied. Where such biodegradable plastics are used in producing laminates and films, extruders are used for extrusion lamination. In addition, used are techniques of melt spinning and injection molding of resins. In those techniques, resins are generally used as their hot melts.

In other embodiments of using conventional synthetic resins including biodegradable resins, used are synthetic emulsions as prepared through emulsion polymerization, such as typically synthetic rubbers and polyvinyl acetate resins, and also hot melts of resin compositions as prepared by hot-melting resins, typically polyvinyl acetate resins along with paraffins.

Where polyvinyl chloride resins and the like are used, they may be dispersed in plasticizers or organic solvents to give plastisols and organosols.

In those conventional cases, resins are melted under heat, or emulsified during their production, or organic solvents (including plasticizers) are used. No one knows an aqueous dispersion consisting indispensably of a thermoplastic biodegradable resin, which is prepared by dispersing and stabilizing a powder of the resin itself in water, and even knows that the dispersion can be applied onto substrates or can be cast onto substrates for bonding those substrates through vaporization of water, or the dispersion can be used for processing substrates themselves or their surfaces, or the dispersion can be formed into films, sheets, plates and others through casting.

The object of the present invention is to provide an aqueous dispersion of a biodegradable resin composition with biodegradability and thermal decomposability and with good handlability, which is prepared by dispersing and stabilizing in water a thermoplastic, biodegradable resin composition optionally along with additives, and which is used in various fields of papermaking, non-woven fabric production, film and sheet production and woven fabric production, in those of dispersed adhesive production, and in those of metal processing, plastic processing, wood processing and stone processing.

DISCLOSURE OF THE INVENTION

In order to attain the object, we, the present inventors have assiduously studied for obtaining and developing a starch-type, thermoplastic and biodegradable resin composition, and, as a result, have found an aqueous dispersion of a biodegradable resin composition with good handlability, which comprises the ingredients mentioned below, and its applications. We have further found that various products can be obtained by the use of the composition.

(1) The aqueous dispersion of a biodegradable resin composition of the invention as claimed in any of claims 1 to 24 basically comprises a biodegradable resin composition as dispersed and stabilized in water, in which the base polymer constituting the biodegradable resin composition substantially comprises a water-insoluble starch-type, biodegradable resin. Preferably, the biodegradable resin composition is selected from (1) esterified starches having a high degree of ester substitution of not smaller than 1.0, (2) esterified, vinyl ester-grafted polymer starches (see the inventors' Japanese Patent Application No. 7-44487), (3) esterified, polyester-grafted polymer starches (see the inventors' Japanese Patent Application No. 7-133873), and (4) esterified, polyester-grafted polymer starch: linear polyester alloys (see the inventors' Japanese Patent Application No. 7-179035), and this is dispersed and stabilized in water along with additives such as plasticizer and others.

The biodegradable resin may be combined with any other various polymers to form the base polymer. If desired, additives such as plasticizer, filler and dispersion stabilizer may be added to the base polymer.

(2) In the aqueous dispersion of a biodegradable resin composition as claimed in any of claims 25 to 40, the water-insoluble solid particles as dispersed in water has a mean grain size of not larger than 50 $\mu$m.

(3) The invention as claimed in any of claims 41 to 45 relates to the use of the aqueous dispersion of a biodegradable resin composition of any of claims 1 to 40, in which, concretely, the aqueous dispersion is used (1) in processing paper, non-woven fabrics, films, sheets and woven fabrics, (2) in adhesive compositions, or (3) in processing metals, plastics, wood, stone or (4) it is cast to give castings.

BEST MODES OF CARRYING OUT THE INVENTION

Now described in detail hereinunder are modes of carrying out the invention.

A. The biodegradable resin composition to be in the aqueous dispersion of the invention comprises a base polymer, in which the base polymer substantially comprises a water-insoluble starch-type, biodegradable resin.

The starch-type, biodegradable resin indicates a starch-derived polymer which is insoluble in water in its steady state and which is degraded by microbes into water and carbon dioxide. Preferred examples of the resin are mentioned below.

(1) Esterified starches having a high degree of ester substitution:

These are starch esters in which the ester moiety has from 2 to 18 carbon atoms and which has a degree of ester substitution of not smaller than 1.0. For these, used are any ordinary esterified starches having a high degree of ester substitution, which are produced using esterifying reagents of halides, anhydrides or vinyl esters of carboxylic acids having from 2 to 18 carbon atoms.

(2) Esterified, vinyl ester-grafted polymer starches (see Japanese Patent Application No. 7-44487 published as Unexamined Laid-Open No. 8-239402):

Basically, these are starches as esterified and grafted with polyvinyl esters, in which the acid for the esterification is one or more selected from saturated or unsaturated fatty acids and aromatic carboxylic acids having from 2 to 18 carbon atoms and the acid for the polyvinyl ester moiety is one or more selected from saturated or unsaturated fatty acids and aromatic carboxylic acids having from 2 to 18 carbon atoms.

Specifically, the esterified, vinyl ester-grafted polymer starches may be represented by the following structural formula:

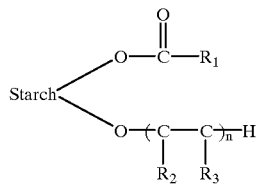

wherein,

Starch represents a residue of a starch molecule;

$R_1$ represents any of alkyl, alkenyl and aryl groups each having from 1 to 17, preferably from 1 to 7 carbon atoms;

$R_2$ represents a hydrogen atom or an alkyl group;

$R_3$ represents $OCOR_4$ or $COOR_4$;

$R_4$ represents any of alkyl, alkenyl and aryl groups each having from 1 to 17, preferably from 1 to 7 carbon atoms.

For $R_1$ and $R_4$, the alkyl group includes, for example, methyl, ethyl, propyl, butyl, octyl, dodecyl and stearyl groups; the alkenyl group includes, for example, acryl, hexenyl and octenyl groups; and the aryl group includes, for example, benzyl, p-toluyl and xylyl groups. Of those, preferred are alkyl groups such as methyl, ethyl and propyl groups.

The esterified, vinyl ester-grafted polymer starches shall have a degree of ester substitution (DS) of from 0.1 to 2.8, but preferably from 0.5 to 2.5, and have a degree of polyvinyl ester graftation of not larger than 50% by weight, but preferably from 5 to 45% by weight.

The degree of polyvinyl ester graftation indicates the amount, in terms of % by weight relative to the total amount, of the polyvinyl ester as grafted with the starch skeleton via ether bonding.

If esterified, vinyl ester-grafted polymer starches having a degree of ester substitution of smaller than 0.1 are used, they are not so effective in improving the properties, such as moisture absorption resistance and shapability, of the composition; but if having the degree of larger than 2.8, their biodegradability is poor.

If they have a degree of graftation of larger than 50% by weight, their biodegradability is poor.

The method for producing the esterified, vinyl ester-grafted polymer starches for use in the invention is not specifically defined. For example, they may be produced using esterifying reagents of vinyl esters in which the ester moiety has from 2 to 18 carbon atoms and using grafting reagents.

(3) Esterified, polyester-grafted polymer starches (see Japanese Patent Application No. 7-133873 published as Unexamined Laid-Open No. 8-301994):

Basically, these are starches as esterified and grafted with polyesters, in which the acid for the esterification is one or more selected from saturated or unsaturated fatty acids and aromatic carboxylic acids having from 2 to 18 carbon atoms and the polyester moiety is a ring-cleaved polymer of one or more, 4-membered to 12-membered lactones, and in which the terminal hydroxyl groups are blocked through esterification.

Specifically, the esterified, polyester-grafted polymer starches may be represented by the following structural formula:

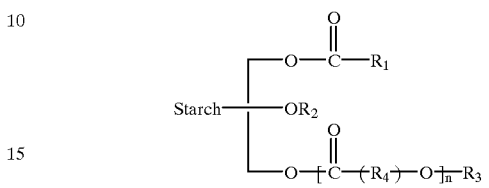

wherein,

Starch represents a residue of a starch molecule (including denatured starch molecules with a low degree of denaturation);

$R_1$ represents any of alkyl, alkenyl and aryl groups each having from 1 to 17, preferably from 1 to 7 carbon atoms;

$R_2$ represents a hydrogen atom, or an acyl group having from 2 to 18 carbon atoms;

$R_3$ represents an acyl group having from 2 to 18 carbon atoms, or a hydrogen atom;

$R_4$ represents one or more alkylene groups of typically $C_mH_{2m}$ (where m=1 to 11), or an ethylidene group.

The alkyl group for $R_1$ and that in the acyl group include, for example, methyl, ethyl, propyl, butyl, octyl, dodecyl and stearyl groups; the alkenyl group includes, for example, acryl, hexenyl and octenyl groups; and the aryl group includes, for example, benzyl, p-toluyl and xylyl groups. Of those, preferred are alkyl groups such as methyl, ethyl and propyl groups.

The esterified, polyester-grafted polymer starches shall have a degree of ester substitution (DS) of from 0.1 to 3.0, but preferably from 0.5 to 3.0, and have a degree of polyester (polylactone) grafting molecule substitution of from 0.1 to 20, but preferably from 0.2 to 10.

The degree of grafting molecule substitution (MS) as referred to herein is obtained according to the following equation.

MS
=((amount by weight of lactone added to starch−amount by weight of lactone unreacted)/molecular weight of lactone)/(amount by weight of starch/molecular weight of starch)

If esterified, polyester-grafted polymer starches having DS of smaller than 0.1 are used, they are not so effective in improving the properties, such as moisture absorption resistance and shapability, of the composition. The DS of the esterified, polyester-grafted polymer starches for use in the invention is preferably as near to 3.0 as possible, since the properties of the shaped articles of the resin composition in aqueous environment, such as the water-proofness thereof, are better. Even though esterified, polyester-grafted polymer starches having MS of smaller than 0.1 are used, the resin composition could be plasticized. However, such starches are not so effective in improving the properties of the shaped articles of the resin composition, especially in improving their properties in aqueous environment while the articles are made to be still biodegradable. On the other hand, esterified, polyester-grafted polymer starches having MS of larger than 20 are impracticable, since they are expensive and require much time for their reaction and since the properties of the articles of the resin composition are poor.

The method for producing the esterified, polyester-grafted polymer starches for use in the invention is not specifically defined. For example, they may be produced using esterifying reagents of vinyl esters in which the ester moiety has from 2 to 18 carbon atoms, or acid anhydrides or chlorides, and using grafting reagents of 4-membered to 12-membered lactones.

(4) Esterified, polyester-grafted polymer starch alloys (see Japanese Patent Application No. 7-179035 published as Unexamined Laid-Open No. 9-31308):

Basically, these are alloys of esterified, polyester-grafted polymer starches (e.g., starches as esterified and grafted with polyesters) with independent polyesters as uniformly dispersed therein, in which the independent polyesters have the same constitutional units as those constituting the grafted side chains.

In these, the acid for the esterification is one or more selected from saturated or unsaturated fatty acids and aromatic carboxylic acids having from 2 to 18 carbon atoms, the polyester for the grafting polymerization is a ring-cleaved polymer of one or more, 4-membered to 12-membered lactones, and all or a part of the hydroxyl group as directly bonding to the starch skeleton, the terminal hydroxyl group of each grafting side chain, and the terminal hydroxyl groups of the independent polymer are blocked through esterification. Specifically, the esterified, polyester-grafted polymer starch alloys may be represented by the following structural formula:

Esterified, polyester-grafted starch

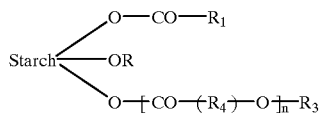

+ Independent polyester

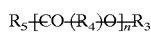

wherein,

Starch represents a residue of a starch molecule (including denatured starch molecules with a low degree of denaturation);

$R_1$ represents any of alkyl, alkenyl and aryl groups each having from 1 to 17, preferably from 1 to 7 carbon atoms;

$R_2$ represents a hydrogen atom, or an acyl group having from 2 to 18 carbon atoms;

$R_3$ represents an acyl group having from 2 to 18 carbon atoms, or a hydrogen atom;

$R_4$ represents one or more saturated hydrocarbon groups of typically $C_mH_{2m}$ (where m=1 to 11);

$R_5$ represents an alkoxy group having up to 10 carbon atoms, a poly-valent alkoxy group having up to 200 carbon atoms, or a hydroxyl group.

The alkyl group for $R_1$ and that in the acyl group include, for example, methyl, ethyl, propyl, butyl, octyl, dodecyl and stearyl groups; the alkenyl group includes, for example, acryl, hexenyl and octenyl groups; and the aryl group includes, for example, benzyl, p-toluyl and xylyl groups. Of those, preferred are alkyl groups such as methyl, ethyl and propyl groups.

The esterified, polyester-grafted polymer starches shall have a degree of ester blocking of from 15 to 100%, but preferably from 21 to 100%, and have a degree of polyester (polylactone) grafting molecule substitution of from 0.1 to 20, but preferably from 0.2 to 10.

The proportion of the independent polyester (polylactone) moiety that has the same constitutional units as those constituting the grafting side chains, to the entire starch alloy may be not larger than 70%, but preferably not larger than 50%.

The grafting side chain and the independent polyester may have a molecular weight of from 500 to 200,000, but preferably from 1,000 to 150,000.

If esterified, polyester-grafted polymer starches having a degree of ester blocking of smaller than 15% are used, they are not so effective in improving the properties, such as moisture absorption resistance, water-proofness and shapability, of the composition. The degree of ester blocking of the esterified, polyester-grafted polymer starches for use in the invention is preferably as near to 100% as possible, isince the properties of the shaped articles of the resin composition in aqueous environment, such as the water-proofness thereof, are better.

Even though esterified, polyester-grafted polymer starches having a degree of grafting molecule substitution (MS) of smaller than 0.1 are used, the resin composition could be plasticized. However, such starches are not so effective in improving the properties of the shaped articles of the resin composition, especially in improving their properties in aqueous environment while the articles are made to be still biodegradable. On the other hand, esterified, polyester-grafted polymer starches having MS of larger than 20 are impracticable, since they are expensive and require much time for their reaction.

The proportion of the independent polyester to be in the starch alloy is determined, depending on the molecular weight and the properties of the independent polyester and those of the esterified, polyester-grafted polymer starch, and on the balance between the properties of the starch alloy and the costs of the constituent materials. Preferably, the proportion may be from 5 to 70% relative to the total weight of the starch alloy. If it is smaller than 5%, the resin composition is too hard and brittle. However, if larger than 70%, the stiffness of the resin composition is lowered, and, in addition, the cost of the starch alloy disadvantageously increases.

If the grafting side chain and the independent polyester that constitute the starch alloy have a molecular weight of smaller than 500, they are not so effective in improving the properties of the starch alloy and even the properties of the resin composition. However, if having a molecular weight of larger than 200,000, they are also unfavorable in that the reaction time for reacting them to produce the starch alloy is prolonged and that the handlability of the constituent materials is poor.

The method for producing the esterified, polyester-grafted polymer starch alloys for use in the invention is not specifically defined. For example, the starch moiety and the alloying moiety are separately prepared, and these are melted under heat and mixed, or may be mixed along with diluent solvents. One embodiment of producing the esterified, polyester-grafted polymer starch alloys is mentioned below.

Using esterifying reagents of vinyl esters or acid anhydrides or halides, and using lactones as grafting reagents and as alloying reagents for independent polymers, these are reacted and polymerized with starch in non-aqueous organic solvents in the presence of esterifying/grafting catalysts and alloying catalysts for independent polymers, whereupon three reactions of esterification, graftation and alloying polymerization are effected all at once or one after another.

(5) The base polymer may comprise other polymers apart from the starch-type, biodegradable resins such as those mentioned hereinabove. As the additional polymers, preferred are one or more selected from ester-type and/or ether-type starch derivatives, biodegradable polyesters, cellulose derivatives, polyvinyl alcohols and polyvinyl esters. Also usable are polycondensates of, for example, polyamides, polycarbonates and polyurethanes; vinyl polymers other than polyvinyl esters; and polyolefins, polyalkylene oxides, biodegradable polyalkylene oxides, ethylene-vinyl acetate copolymers, ethylene-ethyl acrylate copolymers, ethylene-methyl acrylate copolymers, ABS resins, styrene-acrylonitrile copolymers, etc.

Specific examples of those polymers are mentioned below.
Biodegradable polyesters:
Polycaprolactones, polylactic acids, polyadipates, polyhydroxybutyrates, polyhydroxybutyrate valerates, etc.
Ester-type and ether-type starch derivatives:
Hydroxyethylated starches, hydroxypropylated starches, cationic starches, maleic acid ester starches, sulfated starches, p-toluenesulfonated starches, octenylsuccinated starches, etc.
Cellulose derivatives:
Cellulose acetates, hydroxyethyl celluloses, hydroxypropyl celluloses, methyl celluloses, carboxyalkylated celluloses, etc.
Polyvinyl esters:
Polyvinyl acetates, polyacrylonitriles, polyvinyl carbazoles, polyacrylates, polymethacrylates, etc.
Polyolefins:
Polyethylenes, polyisobutylenes, polypropylenes, etc.
Vinyl polymers (except polyvinyl esters):
Polyvinyl chlorides, polystyrenes, etc.
Polyalkylene oxides:
Polyethylene oxides, polypropylene oxides, etc.

B. If desired, additives such as plasticizers, fillers, dispersion stabilizers (emulsifiers, thickeners, dispersants), antioxidants and stabilizers etc. are optionally added to the base polymer to produce the biodegradable resin composition. These additives, if added to the base polymer, are to control the mechanical properties of the coated or shaped articles of the resin composition (for plasticizers, fillers), or to stabilize the liquid condition of the resin composition (for dispersion stabilizers, etc.), or to stabilize the properties of resins in water or to prevent the coated or shaped articles of the resin composition from being oxidized and deteriorated (for antioxidants, stabilizers, etc.). The amount of those additives to be added varies, depending on the applications of the aqueous dispersion of the biodegradable resin composition, and therefore could not be specifically defined.

The additives are so selected that those added favorably realize their objects such as those mentioned above. The constitutions of those additives are described in more detail hereinunder.
(1) Plasticizers:
Mentioned are phthalates, aromatic carboxylates, esters of aliphatic dibasic acids, derivatives of esters of fatty acids, phosphates, polyester-type plasticizers, epoxy plasticizers, and polymer-type plasticizers, of which one or more are selected for use in the invention.
Concretely mentioned are the following:

Phthalates:
Dimethyl, diethyl, dibutyl and dioctyl phthalates, ethylphthalylethyl glycolate, ethylphthalylbutyl glycolate, etc.
Esters of aliphatic dibasic acids:
Butyl oleate, glycerin monooleate, butyl adipate, n-hexyl adipate, etc.
Aromatic carboxylates:
Trioctyl trimellitate, diethylene glycol benzoate, octyl hydroxybenzoate, etc.
Derivatives of esters of fatty acids:
Sucrose octacetate, esters of diethylene glycol dibenzoate hydroxy acids, methyl acetylricinoleate, triethyl acetylcitrate, triacetin, tripropionin, diacetylglycerin, glycerin monostearate, etc.
Phosphates:
Tributyl phosphate, triphenyl phosphate, etc.
Epoxy plasticizers:
Epoxidated soybean oil, epoxidated castor oil, alkylepoxy stearates, etc.
Polymer-type plasticizers:
Various liquid rubbers, terpenes, linear polyesters, etc.
(2) Fillers:
Mentioned are inorganic fillers, organic fillers and synthetic fillers, of which one or more are selected for use in the invention.
Concretely mentioned are the following:
Inorganic fillers:
Talc, titanium oxide, clay, chalk, limestone, calcium carbonate, mica, glass, diatomaceous earth, wollastonite, various silica salts, magnesium salts, manganese salts, glass fiber, various ceramic powders, etc.
Organic fillers:
Cellulose fiber and powder (including their derivatives), wood powder, pecan fiber, cotton powder, husks, cotton linters, wood fiber, baggasse, etc.
Synthetic fillers:
Urea resin filler, etc.
(3) Dispersion stabilizers (dispersants, thickeners, emulsifiers):
The dispersion stabilizers as referred to herein include dispersants for suspensions, emulsifiers for emulsions, and even thickeners and the like. The dispersion stabilizers are not always indispensable when the aqueous dispersion of the invention is such a colloidal dispersion that the dispersed phase therein, which will be referred to in detail hereinunder, is not larger than about 1 $\mu$m in size, but they are indispensable for dispersions of crude grains that are larger than about 1 $\mu$m.

For the dispersion stabilizers, usable are one or more selected from salts of fatty acids having from 4 to 18 carbon atoms, anionic surfactants, nonionic surfactants, cationic or anionic, water-soluble polymers, condensed phosphates, cationic starch derivatives, cellulose derivatives, vegetable gum and its derivatives, animal polymers, microbial polymers, and aqueous, emulsified synthetic polymers.

For those, concretely mentioned are the following: Salts of fatty acids having from 4 to 18 carbon atoms:
Sodium butanoate, potassium octanoate, sodium stearate, etc.
Nonionic surfactants:
Alkyl polyalkylene oxides, sucrose esters of fatty acids, sorbitan esters of fatty acids, dimethylpolysiloxanes, etc.
Anionic surfactants:
Sodium alkylsulfates, sodium alkylsulfonates, etc.
Water-soluble polymers:
Cationic polyacrylamide, PVA, sodium polyacrylate, polyethyleneimine, condensed naphthalenesulfonic acid, etc.

Condensed phosphates:

Sodium hexametaphosphate, sodium tripolyphosphate, etc.

Cationic starch derivatives:

Corn starch base, tapioca starch base, potato starch base, etc.

Cellulose derivatives:

Carboxymethyl cellulose, carboxyethyl cellulose, hydroxypropyl cellulose, cationated celluloses, etc.

Vegetable gum and its derivatives:

Arabic gum, guar gum, xanthane gum, etc.

Animal polymers:

Casein, chitosan, chitin, etc.

Microbial polymers:

Xanthane gum, polydextrose, pullulan, etc.

Aqueous, emulsified synthetic polymers:

Synthetic rubber latex, polyvinyl acetate emulsion, etc.

C. The aqueous dispersion of the invention basically comprises the biodegradable resin composition such as that mentioned herein above, as dispersed and stabilized in water.

(1) The method of dispersing and stabilizing the resin composition in water is not specifically defined. For example, employable is any of a method of dispersing the biodegradable resin composition with stirring it in water, using a ball mill or the like; or a method of emulsifying and dispersing the biodegradable resin composition at a high temperature and under pressure followed by cooling it to give an aqueous dispersion of the biodegradable resin composition.

Specifically, when the resin is soft and has a low softening point, it can be easily melted and dispersed (that is, emulsified and dispersed) in water at a high temperature and under high pressure, using a disperser or the like, and the resulting dispersion may be cooled with further stirring it. On the other hand, when the resin is hard and has a low softening point, it is pre-dispersed in water to give a slurry, then the slurry is wet-milled using a ball mill or the like, and additives such as plasticizers and others are added thereto.

(2) The grain size of the dispersed phase (biodegradable resin composition) has some influences on the handlability of the resin composition in various processing steps and even on the properties of the processed products. For example, in producing processed paper, the degree of covering of the paper surface with the resin composition is influenced by the particle size of the dispersed phase. Therefore, it is desirable that the dispersed phase of the resin composition has a mean particle size of not larger than about 50 $\mu$m, more preferably not larger than about 10 $\mu$m.

The resin composition having a mean particle size of larger than 50 $\mu$m could be used in the field of producing adhesives. However, if used in the filed of surface processing of articles, the resin composition having such a large mean particle size often produces various troubles that uneven coating still remains after the final finish of the surfaces coated therewith, or the coated surfaces have pin holes. If used in printing, it may produce mottles on the surfaces as printed therewith along with pigments. Therefore, for all those esterified starches having a high degree of ester substitution, esterified, vinyl ester-grafted polymer starches, esterified, polyester-grafted polymer starches, esterified, polyester-grafted polymer starch: linear polyester alloys and other biodegradable resins, and in all their applications, it is preferable that the biodegradable resin composition has a mean particle size of not larger than about 50 $\mu$m, more preferably not larger than about 10 $\mu$m.

However, where the composition is used in casting under limited conditions, its largest mean particle size may be up to 1 mm.

D. The aqueous dispersion of the biodegradable resin composition of the invention can be applied onto paper without using extruders or the like but using any ordinary coaters, and the thus-coated paper may be finished to be waterproof processed paper, which has good surface luster like laminated parer. This. coating technique also applies not only to the processing of tabular substrates such as nonwoven fabrics, films, sheets, fabrics and the like, as so mentioned hereinabove, for which the aqueous dispersion may be applied onto those substrates and cured thereon, or may be previously added to the materials from which those substrates are made, but also to the production of adhesives. In the latter, produced are biodegradable adhesives.

Controlling its concentration or adding thereto suitable additives, the aqueous dispersion of the biodegradable resin composition of the invention can be cast to give various castings, such as cast films or cast articles.

EXAMPLES

The following Examples and Comparative Examples are to concretely demonstrate the advantages of the invention, which, however, are not intended to restrict the scope of the invention. Unless otherwise specifically indicated, "parts" as referred to hereinunder to indicate the amount of ingredients are by weight.

Example 1

6 kg of highly-acetylated starch (DS=2.5) was dispersed in 28 kg of water, and milled, using a wet mill, to obtain a dispersion having a solid content of 18% and a mean particle size of 5 $\mu$m. To 22 kg of this dispersion, added was a plasticizer emulsion as previously emulsified with a colloid mill (its composition is shown in Table 1). This was further milled and dispersed, using a wet mill, to obtain an aqueous dispersion of the biodegradable resin. The properties of this aqueous dispersion are shown in Table 3.

Example 2

25 g of plasticizer, triethyl acetylcitrate was added to 100 g of acetylated, vinyl acetate-grafted polymer starch (degree of acetylation=2.1; percentage by weight of grafting=18%; homopolymer of polyvinyl acetate=23%), which was then dissolved in 100 g of ethanol. The resulting ethanol solution was gradually added to and finely dispersed in 500 g of water, while being milled with a colloid mill, to give a dispersion having a mean particle size of 4.5 $\mu$m. Ethanol was removed under reduced pressure from this dispersion, and dispersant, thickener and emulsifier were added to the dispersion, using a colloid mill, as in Table 2.

The properties of the aqueous dispersion thus obtained herein are shown in Table 3.

Example 3

30 g of plasticizer, triacetin was added to 100 g of acetylated, caprolactone-grafted polymer starch (degree of terminal hydroxyl blocking =70%; percentage by weight of grafting =45%), and milled using a plast mill. The resulting mixture was put into a hot-pressure emulsifying machine along with water, methyl cellulose and sodium dodecylsulfate, and emulsified under heat at 160° C., and thereafter cooled to room temperature, 25° C. to obtain a dispersion having a mean particle size of 3.1 $\mu$m. Its composition is shown in Table 2.

The properties of the aqueous dispersion thus obtained herein are shown in Table 3.

Example 4

The aqueous dispersion obtained in Example 1 was cast onto a glass sheet, using a film applicator as defined in JIS K5400, and processed in a hot air circulating drier at 90° C. for 15 minutes to obtain a biodegradable resin film. Its glass transition temperature (Tg) and softening temperature were measured, according to JIS K7121 and JIS K7196, to be 24.93° C. and 38.33° C., respectively.

[Application Example 1]

The aqueous dispersion obtained in Example 1 was applied onto woodfree paper (weight: 105 g/m$^2$), using a film applicator and a bar coater as defined in JIS K5400, and dried in a hot air circulating drier to form a film thereon. Thus was obtained biodegradable resin-coated paper. A part of this was surface-processed, using a heat pressure roll (roll surface temperature 85° C.).

The amount of the dispersion applied onto the woodfree paper, the temperature at which the coated paper was dried, and the properties of the coated paper are shown in Tables 4 and 5.

[Application Example 2]

The aqueous dispersion obtained in Example 2 was applied onto a corrugating medium (weight: 120 g/m$^2$), using a film applicator and a bar coater as defined in JIS K5400, and dried in a hot air circulating drier to form a film thereon. Thus was obtained biodegradable resin-coated paper.

The amount of the dispersion applied onto the medium, the temperature at which the coated paper was dried, and the properties of the coated paper are shown in Table 6.

[Application Example 3, Comparative Application Example 3]

The aqueous dispersion obtained in Example 1 was added to 0.3% pulp slurry, which had been beaten at a beating degree of CSF 450, along with cationic starch, the ratio of the dispersion (in terms of its solid content) to pulp being 1%. This was sheeted and then heated under pressure at 105° C. for 3 minutes to obtain biodegradable resin-containing, waterproof paper (weight: 65.0 g/m$^2$; L/N=80/20; amount of calcium carbonate added: 15% relative to pulp) (Application Example 3).

In the same manner as above except that liquid polyacrylamide (commercially-available, non-biodegradable resin, "POLYSTRON 117" manufactured by Arakawa Chemical Co.) was used in place of the aqueous dispersion of Example 1, the amount of the resin added being the same as in Application Example 3. Thus was obtained waterproof paper of Comparative Application Example 3.

The wet tensile strength of those paper samples was 3.8 kgf (in Application Example 3) and 4.1 kgf (in Comparative Application Example 3).

The data indicate that the aqueous dispersion of the biodegradable resin composition of the invention produces a high wet adhesion strength, which is comparable to that produced by synthetic resin.

[Application Example 4, Comparative Application Example 4]

The aqueous dispersion obtained in Example 1 was applied onto non-bleached kraft paper (weight: 77 g/m$^2$), using a film applicator and a bar coater as defined in JIS K5400, and dried in a hot air circulating drier to form a film thereon. Thus was obtained biodegradable resin-coated paper, in which the resin base coated was 27 g/m$^2$ (Application Example 4).

In the same manner as above except that low-density polyethylene (SUMIKASEN L211, manufactured by Sumitomo Chemical Co.) was laminated on non-bleached kraft paper of the same type, in place of using the aqueous dispersion of Example 1. In this, the amount of the polymer laminated was 20 g/m$^2$ in terms of the resin base. Thus was obtained coated paper of Comparative Application Example 4.

The hot-sealing strength of each paper sample is shown in Table 7.

[Application Example 5]

The aqueous dispersion obtained in Example 3 was applied onto aluminium foil having a thickness of 0.5 mm, the amount of the resin base coated being 60 g/m$^2$. Then, this was dried and heated, using a hot roll, whereby a protective film was formed on the foil.

This protective film can be easily peeled off from the aluminium foil, and is surely practicable.

[Application Example 6, Comparative Application Example 6]

As in Table 8, a pigment-coating composition for paper was prepared, which comprised the aqueous dispersion obtained in Example 1 and an adhesive component, sodium carboxymethyl cellulose (Cellogen, manufactured by Dai-ichi Kogyo Seiyaku Co.). This was applied onto one surface of woodfree paper (weight: 64 g/m$^2$), then dried in a hot air circulating drier at 130° C. for 5 minutes, and thereafter calendered three times, using a super calender, at 55° C. and under a pressure of 100 kg/cm$^2$. Thus was obtained pigment-coated paper (Application Example 6).

In the same manner as above except that styrene-butadiene copolymer resin latex (SN-307, manufactured by Sumitomo Dow Co.) and oxidized starch (SK-200, manufactured by Japan Corn Starch Co.) were used as adhesive components and that polyamide resin (SUMIREZ RESIN 633, manufactured by Sumitomo Chemical Co.) was used as a water repellent, a pigment-coating composition for paper was prepared as in Table 8 (Comparative Application Example 6). Using this, produced was pigment-coated paper in the same manner as in Application Example 6.

The properties of the pigment-coating compositions prepared herein, and those of the coated paper samples are shown in Table 9.

The data in Table 9 indicate that the pigment-coated paper sample as produced using the aqueous dispersion of the biodegradable resin composition of the invention is comparable to that as produced using the conventional, non-biodegradable resin (latex).

TABLE 1

| Components | | Amount (wt. pts.) |
|---|---|---|
| Water | | 100 |
| Plasticizer (EPEG) | | 100 |
| Dispersion Stabilizer | Sodium dodecylsulfate | 0.5 |
| | Xanthane gum | 0.25 |
| | Silicone emulsion | 0.1 |

TABLE 2

| Components | | Example 2 | Example 3 |
|---|---|---|---|
| Dispersion medium | | 250 | 300 |
| Base polymer | Acetylated, vinyl acetate-grafted polymer starch | 100 | — |

TABLE 2-continued

| | Components | | Example 2 | Example 3 |
|---|---|---|---|---|
| | | Acetylated, caprolactone-grafted polymer starch | — | 100 |
| Plasticizer | Triethyl acetylcitrate | | 25 | — |
| | Triacetin | | — | 30 |
| Dispersion Stabilizer | Sodium laurate | | 0.8 | — |
| | Hydroxyethyl cellulose | | 7.2 | — |
| | Sodium dodecylsulfate | | — | 0.5 |
| | Methyl cellulose | | — | 5.5 |

TABLE 3

| | Example 1 | Example 2 | Example 3 | Test Method |
|---|---|---|---|---|
| Solid content (%) | 23.6 | 28.2 | 28.2 | 105° C., constant weight |
| pH | 6.1 | 6.5 | 6.5 | Glass electrode pH meter |
| B-type viscosity | | | | |
| 6 rpm | 5480 | 4950 | 4950 | B-type viscometer (rotor No.3 |
| 60 rpm | 1370 | 1060 | 1060 | |

TABLE 4

| Sample No. | Amount Coated | Drying Temperature | Surface Treatment |
|---|---|---|---|
| 1 | 27.2 | 75 | No |
| 2 | 29.0 | 75 | Yes |
| 3 | 27.5 | 90 | No |
| 4 | 28.0 | 90 | Yes |
| 5 | 28.0 | 120 | No |
| 6 | 28.5 | 120 | Yes |
| 7 | 47.8 | 75 | No |
| 8 | 45.4 | 75 | Yes |
| 9 | 44.3 | 90 | No |
| 10 | 49.3 | 90 | Yes |
| 11 | 46.4 | 120 | No |
| 12 | 46.7 | 120 | Yes |
| Non-coated paper | — | — | — |

Amount coated: g/m², in terms of the resin base.
Drying temperature: °C.

TABLE 5

| Sample No. | Surface Luster | Water Absorption | Moisture Permeation | Oil Repellency |
|---|---|---|---|---|
| 1 | 4.0 | 14.5 | 2870 | <1 |
| 2 | 85.9 | 1.6 | 1880 | 16 |
| 3 | 8.0 | 3.4 | 2040 | 16 |
| 4 | 86.5 | 0.9 | 1780 | 16 |
| 5 | 17.1 | 3.6 | 1810 | 16 |
| 6 | 85.3 | 2.5 | 1960 | 16 |
| 7 | 6.6 | 2.5 | 1490 | 16 |
| 8 | 86.8 | 1.5 | 1420 | 16 |
| 9 | 5.8 | 3.0 | 1410 | 16 |
| 10 | 86.0 | 1.7 | 1370 | 16 |
| 11 | 18.6 | 2.5 | 1450 | 16 |
| 12 | 86.2 | 1.0 | 1240 | 16 |
| Non-coated paper | 6.2 | 20.7 | 7670 | <1 |

<Test Methods>

Surface luster: JIS P8142 (%)

Water absorption: JIS P8140, for 1 minute (g/m²)

Moisture permeation: JIS Z0208 (g/m²·24 hrs)
Oil repellency: TAPPI-RC-338

TABLE 6

| Sample No. | Amount Coated | Drying Temperature | Water Absorption | Moisture Permeation | Oil Repellency |
|---|---|---|---|---|---|
| 1 | 50.6 | 90 | 13.1 | 1490 | 16 |
| 2 | 56.6 | 120 | 11.9 | 1360 | 16 |
| 3 | 99.1 | 90 | 6.8 | 860 | 16 |
| Non-coated paper | — | — | 105.0 | 7260 | <1 |

TABLE 7

| | | Hot-sealing Strength (gf/1.5 cm) | |
|---|---|---|---|
| Sample No. | Hot-sealing Temperature (°C.) | Application Example 4 | Comparative Application Example 4 |
| 1 | 60 | 142 | 0 |
| 2 | 80 | 383 | 0 |
| 3 | 100 | 407 | 95 |
| 4 | 120 | 410 | 104 |

TABLE 8

| | Absolute Amount Added (wt. pts.) | |
|---|---|---|
| | Application Example 6 | Comparative Application Example 6 |
| Clay | 70 | 70 |
| Precipitated calcium carbonate | 30 | 30 |
| Sodium polyacrylate | 0.2 | 0.2 |
| Composition of Example 1 | 25 | — |
| Sodium carboxymethyl cellulose | 0.5 | — |
| Styrene-butadiene latex | — | 12 |
| Oxidized starch | — | 6 |
| Polyamide resin | — | 0.8 |
| Calcium stearate | 0.5 | 0.5 |
| Solid content (%) | 50 | 60 |

TABLE 9

| | Application Example 6 | Comparative Application Example 6 |
|---|---|---|
| Viscosity (cp)(*1) | 870 | 920 |
| Amount coated (g/m²) | 11.2 | 10.9 |
| Whiteness (%)(*2) | 80.5 | 80.8 |
| Surface smoothness (sec)(*3) | 2900 | 2800 |
| Surface luster | 73.4 | 72.8 |
| Dry pick(*4) | 8 | 9 |
| Wet pick(*5) | 10 | 8 |

Methods and conditions for measuring the properties:
(*1): BM viscometer, No. 3 spindle, 60 rpm, 25° C.
(*2): JIS P8123
(*3): J. TAPPI No. 5
(*4): RI printer for visual observation 1 is the worst, and 10 is the best.
(*5): RI printer for visual observation 1 is the worst, and 10 is the best.

We claim:

1. An aqueous dispersion of a biodegradable resin composition as dispersed and stabilized in water, wherein the biodegradable resin composition comprises a base polymer consisting substantially of a water-insoluble starch-containing, biodegradable polymeric resin.

2. The aqueous dispersion of a biodegradable resin composition as claimed in claim 1, wherein said starch-containing biodegradable polymeric resin is a starch ester having a degree of ester substitution of not smaller than 1.0, of which the ester moiety has from 2 to 18 carbon atoms.

3. The aqueous dispersion of a biodegradable resin composition as claimed in claim 2, wherein said starch ester is produced using a vinyl ester as the esterifying reagent.

4. The aqueous dispersion of a biodegradable resin composition as claimed in claim 1, wherein said starch-containing biodegradable polymeric resin is an esterified, vinyl ester-grafted polymer starch.

5. The aqueous dispersion of a biodegradable resin composition as claimed in claim 4, wherein said esterified, vinyl ester-grafted polymer starch is produced using a vinyl ester, of which the ester moiety has from 2 to 18 carbon atoms, as the esterifying reagent and also as the grafting reagent.

6. The aqueous dispersion of a biodegradable resin composition as claimed in claim 1, wherein said starch-containing biodegradable polymeric resin is-an esterified, polyester-grafted starch.

7. The aqueous dispersion of a biodegradable resin composition as claimed in claim 6, wherein said esterified, polyester-grafted starch is produced using a vinyl ester, of which the ester moiety has from 2 to 18 carbon atoms, or an acid anhydride or chloride as the esterifying reagent and using a 4-membered to 12-membered lactone as the grafting reagent.

8. The aqueous dispersion of a biodegradable resin composition as claimed in claim 1, wherein said starch-containing, biodegradable polymeric resin is an esterified, polyester-grafted polymer starch alloy that is comprised of an esterified, polyester-grafted polymer starch and an independent polyester which has the same constitutional units as those constituting the polyester moiety of said grafted polymer starch and of which a part or all of the terminal hydroxyl groups are blocked through esterification.

9. The aqueous dispersion of a biodegradable resin composition as claimed in claim 8, wherein said esterified, polyester-grafted polymer starch alloy is produced using a vinyl ester, of which the ester moiety has from 2 to 18 carbon atoms, or an acid anhydride or chloride as the esterifying reagent and using a 4-membered to 12-membered lactone as the grafting reagent and also as the polymerizing reagent for the independent polyester polymer emulsions as the dispersion stabilizer.

10. The aqueous dispersion of a biodegradable resin composition as claimed in any one of claims 1 to 9, wherein the base polymer is comprised of said starch-containing, biodegradable polymeric resin and at least one additional polymer selected from the group consisting of ester-containing starch-containing polymers, ether-containing starch-containing polymers, polyolefinic polymers, polyvinylic polymers, polyester-containing polymers, polyamide-containing polymers, polyalkoxide-containing polymers and cellulose derivatives.

11. The aqueous dispersion of a biodegradable resin composition as claimed in claim 10, wherein the resin that constitutes the base polymer has, in water, a mean particle size of not larger than 50 $\mu$m.

12. The aqueous dispersion of a biodegradable resin composition as claimed in claim 10, wherein said biodegradable resin composition further comprises at least one dispersion stabilizer selected from the group consisting of metal salts of fatty acids, anionic surfactant, nonionic surfactant, cationic surfactant, cationic or anionic water-soluble polymers, condensed phosphates, cationic starch derivatives, cellulose derivatives, vegetable gum and its derivatives, animal polymers, microbial polymers and synthetic polymer emulsions.

13. The aqueous dispersion of a biodegradable resin composition as claimed in claim 12, wherein the resin that constitutes the base polymer has, in water, a mean particle size of not larger than 50 $\mu$m.

14. The aqueous dispersion of a biodegradable resin composition as claimed in claim 10, wherein said biodegradable resin composition further comprises at least one plasticizer selected from the group consisting of phthalates, aromatic carboxylates, esters of aliphatic dibasic acids, derivatives of esters of fatty acids, phosphates, polyester-containing plasticizers, epoxy plasticizers, liquid rubber polymers, and terpene-containing plasticizers.

15. The aqueous dispersion of a biodegradable resin composition as claimed in claim 14, wherein said biodegradable resin composition further comprises at least one filler selected from the group consisting of natural inorganic fillers, natural fillers and synthetic fillers.

16. The aqueous dispersion of a biodegradable resin composition as claimed in claims 15, wherein said biodegradable resin composition further comprises at least one dispersion stabilizer selected from the group consisting of metal salts of fatty acids, anionic surfactant, nonionic surfactant, cationic surfactant, cationic or anionic water-soluble polymers, condensed phosphates, cationic starch derivatives, cellulose derivatives, vegetable gum and its derivatives, animal polymers, microbial polymers and synthetic polymer emulsions.

17. The aqueous dispersion of a biodegradable resin composition as claimed in claim 16, wherein the resin that constitutes the base polymer has, in water, a mean particle size of not larger than 50 $\mu$m.

18. The aqueous dispersion of a biodegradable resin composition as claimed in claim 15, wherein the resin that constitutes the base polymer has, in water, a mean particle size of not larger than 50 $\mu$m.

19. The aqueous dispersion of a biodegradable resin composition as claimed in claim 14, wherein said biodegradable resin composition further comprises at least one dispersion stabilizer selected from the group consisting of metal salts of fatty acids, anionic surfactant, nonionic surfactant, cationic surfactant, cationic or anionic water-soluble polymers, condensed phosphates, cationic starch derivatives, cellulose derivatives, vegetable gum and its derivatives, animal polymers, microbial polymers and synthetic polymer emulsions.

20. The aqueous dispersion of a biodegradable resin composition as claimed in claim 19, wherein the resin that constitutes the base polymer has, in water, a mean particle size of not larger than 50 $\mu$m.

21. The aqueous dispersion of a biodegradable resin composition as claimed in claim 14, wherein the resin that constitutes the base polymer has, in water, a mean particle size of not larger than 50 $\mu$m.

22. The aqueous dispersion of a biodegradable resin composition as claimed in claim 10, wherein said biodegradable resin composition further comprises at least one filler selected from the group consisting of natural inorganic fillers, natural fillers and synthetic fillers.

23. The aqueous dispersion of a biodegradable resin composition as claimed in claim 22, wherein said biodegradable resin composition further comprises at least one dispersion stabilizer selected from the group consisting of metal salts of fatty acids, anionic surfactant, nonionic surfactant, cationic surfactant, cationic or anionic water-soluble polymers, condensed phosphates, cationic starch derivatives, cellulose derivatives, vegetable gum and its derivatives, animal polymers, microbial polymers and synthetic polymer emulsions.

24. The aqueous dispersion of a biodegradable resin composition as claimed in claim 23, wherein the resin that constitutes the base polymer has, in water, a mean particle size of not larger than 50 $\mu$m.

25. The aqueous dispersion of a biodegradable resin composition as claimed in claim 22, wherein the resin that constitutes the base polymer has, in water, a mean particle size of not larger than 50 $\mu$m.

26. The aqueous dispersion of a biodegradable resin composition as claimed in any one of claim 1 to 9, wherein said biodegradable resin composition further comprises at least one plasticizer selected from the group consisting of phthalates, aromatic carboxylates, esters of aliphatic dibasic acids, derivatives of esters of fatty acids, phosphates, polyester-containing plasticizers, epoxy plasticizers, liquid rubber polymers, and terpene-containing plasticizers.

27. The aqueous dispersion of a biodegradable resin composition as claimed in claim 26, wherein said biodegradable resin composition further comprises at least one filler selected from the group consisting of natural inorganic fillers, natural fillers and synthetic fillers.

28. The aqueous dispersion of a biodegradable resin composition as claimed in claims 27, wherein said biodegradable resin composition further comprises at least one dispersion stabilizer selected from the group consisting of metal salts of fatty acids, anionic surfactant, nonionic surfactant, cafionic surfactant, cationic or anionic water-soluble polymers, condensed phosphates, cationic starch derivatives, cellulose derivatives, vegetable gum and its derivatives, animal polymers, microbial polymers and synthetic polymer emulsions.

29. The aqueous dispersion of a biodegradable resin composition as claimed in claim 28, wherein the resin that constitutes the base polymer has, in water, a mean particle size of not larger than 50 $\mu$m.

30. The aqueous dispersion of a biodegradable resin composition as claimed in claim 27, wherein the resin that constitutes the base polymer has, in water, a mean particle size of not larger than 50 $\mu$m.

31. The aqueous dispersion of a biodegradable resin composition as claimed in claim 26, wherein said biodegradable resin composition further comprises at least one dispersion stabilizer selected from the group consisting of metal salts of fatty acids, anionic surfactant, nonionic surfactant, cationic surfactant, cationic or anionic water-soluble polymers, condensed phosphates, cationic starch derivatives, cellulose derivatives, vegetable gum and its derivatives, animal polymers, microbial polymers and synthetic polymer emulsions.

32. The aqueous dispersion. of a biodegradable resin composition as claimed in claim 31, wherein the resin that constitutes the base polymer has, in water, a mean particle size of not larger than 50 $\mu$m.

33. The aqueous dispersion of a biodegradable resin composition as claimed in claim 26, wherein the resin that constitutes the base polymer has, in water, a mean particle size of not larger than 50 $\mu$m.

34. The aqueous dispersion of a biodegradable resin composition as claimed in any one of claims 1 to 9, wherein said biodegradable resin composition further comprises at least one filler selected from the group consisting of natural inorganic fillers, natural organic fillers and synthetic fillers.

35. The aqueous dispersion of a biodegradable resin composition as claimed in claim 34, wherein said biodegradable resin composition further comprises at least one dispersion stabilizer selected from the group consisting of metal salts of fatty acids, anionic surfactant, nonionic surfactant, cationic surfactant, cationic or anionic water-soluble polymers, condensed phosphates, cationic starch derivatives, cellulose derivatives, vegetable gum and its derivatives, animal polymers, microbial polymers and synthetic polymer emulsions.

36. The aqueous dispersion of a biodegradable resin composition as claimed in claim 25, wherein the resin that constitutes the base polymer has, in water, a mean particle size of not larger than 50 $\mu$m.

37. The aqueous dispersion of a biodegradable resin composition as claimed in claim 34, wherein the resin that constitutes the base polymer has, in water, a mean particle size of not larger than 50 $\mu$m.

38. The aqueous dispersion of a biodegradable resin composition as claimed in any one of claims 1 to 9, wherein said biodegradable resin composition further comprises at least one dispersion stabilizer selected from the group consisting of metal salts of fatty acids, anionic surfactant, nonionic surfactant, cationic surfactant, cationic or anionic water-soluble polymers, condensed phosphates, cationic starch derivatives, cellulose derivatives, vegetable gum and its derivatives, animal polymers, microbial polymers and synthetic polymer emulsions.

39. The aqueous dispersion of a biodegradable resin composition as claimed in claim 38, wherein the resin that constitutes the base polymer has, in water, a mean particle size of not larger than 50 $\mu$m.

40. The aqueous dispersion of a biodegradable resin composition as claimed in any one of claims 1 to 9, wherein the resin that constitutes the base polymer has, in water, a mean particle size of not larger than 50 $\mu$m.

41. A tabular product as produced by applying the aqueous dispersion of a biodegradable resin composition of any one of claims 1 to 9 onto a tabular substrate followed by curing it thereon.

42. The tabular product as claimed in claim 41, wherein the tabular substrate is selected from the group consisting of paper, non-woven fabric, film, sheet and woven fabric.

43. A tabular product as produced by adding the aqueous dispersion of a biodegradable resin composition of any one of claims 1 to 9 to materials for said product during production of said product.

44. An adhesive composition indispensably comprising the aqueous dispersion of a biodegradable resin composition of any one of claims 1 to 9.

45. A method for forming a protective film, which comprises applying the aqueous dispersion of a biodegradable resin composition of any one of claims 1 to 9 onto the surface of a hard substrate followed by curing it to form a protective film thereon.

46. The method as claimed in claim 45, wherein the hard substrate is selected from the group consisting of metal sheet, metal film, plastic, wood and stone.

47. A casting as produced by casting the aqueous dispersion of a biodegradable resin composition of any one of claims 1 to 9.

* * * * *

UNITED STATES PATENT AND TRADEMARK OFFICE
CERTIFICATE OF CORRECTION

PATENT NO. : 5,993,530

DATED : November 30, 1999

INVENTOR(S) : Tanaka et al.

It is certified that error appears in the above-identified patent and that said Letters Patent is hereby corrected as shown below:

```
    Title page,
    Item [75], please correct the Third Inventor's name,
```

--NOBUYUKI SUGIURA--

Signed and Sealed this

Twenty-seventh Day of February, 2001

*Attest:*

NICHOLAS P. GODICI

*Attesting Officer*  *Acting Director of the United States Patent and Trademark Office*